(12) United States Patent
Tanaka

(10) Patent No.: US 8,558,729 B2
(45) Date of Patent: Oct. 15, 2013

(54) SOLID-STATE IMAGING APPARATUS

(75) Inventor: Takanori Tanaka, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/428,385

(22) Filed: Mar. 23, 2012

(65) Prior Publication Data

US 2012/0242877 A1 Sep. 27, 2012

(30) Foreign Application Priority Data

Mar. 23, 2011 (JP) ................ P2011-064248

(51) Int. Cl.
*H03M 1/56* (2006.01)

(52) U.S. Cl.
USPC .......................... 341/169; 341/155

(58) Field of Classification Search
USPC .......... 341/169, 155, 156, 157; 348/294, 308, 348/302, 222.1; 382/304; 250/208.1
See application file for complete search history.

(56) References Cited

U.S. PATENT DOCUMENTS 7,671,317 B2 * 3/2010 Shimomura et al. ....... 250/208.1

FOREIGN PATENT DOCUMENTS

JP 2009-33297 A 2/2009

* cited by examiner

*Primary Examiner* — Joseph Lauture
(74) *Attorney, Agent, or Firm* — Westerman, Hattori, Daniels & Adrian, LLP

(57) ABSTRACT

A solid-state imaging apparatus includes a low-order latch circuit, a state variation detection circuit, and an encode signal latch circuit. The state variation detection circuit sequentially compares pulse signals output from two delay elements of a plurality of delay elements among pulse signals latched by the low-order latch circuit and outputs a state variation detection signal when states of the two pulse signals are different. The encode signal latch circuit latches an encode signal when the encode signal having a state corresponding to a delay element outputting a pulse signal input to the state variation detection circuit is input and the state variation detection signal is input.

4 Claims, 14 Drawing Sheets

FIG. 3

| A | B | O |
|---|---|---|
| Low | Low | Low |
| Low | High | Low |
| High | Low | High |
| High | High | Low |

FIG. 4

| N-TH STAGE | (N+1)-TH STAGE | ENCODE SIGNAL φBC1[1:3] (DECIMAL) |
|---|---|---|
| DU[8] | DU[1] | 0 |
| DU[1] | DU[2] | 1 |
| DU[2] | DU[3] | 2 |
| DU[3] | DU[4] | 3 |
| DU[4] | DU[5] | 4 |
| DU[5] | DU[6] | 5 |
| DU[6] | DU[7] | 6 |
| DU[7] | DU[8] | 7 |

FIG. 7

| DELAY ELEMENT | OUTPUT SIGNAL |
|---|---|
| DU[1] | Low |
| DU[2] | High |
| DU[3] | High |
| DU[4] | High |
| DU[5] | High |
| DU[6] | Low |
| DU[7] | Low |
| DU[8] | Low |

FIG. 11

| A | B | C | O |
|---|---|---|---|
| Low | Low | Low | Low |
| Low | Low | High | Low |
| Low | High | Low | Low |
| Low | High | High | Low |
| High | Low | Low | Low |
| High | Low | High | Low |
| High | High | Low | High |
| High | High | High | Low |

FIG. 13

| DELAY ELEMENT | OUTPUT SIGNAL |
|---|---|
| DU[1] | Low |
| DU[2] | High |
| DU[3] | High |
| DU[4] | High |
| DU[5] | High |
| DU[6] | Low |
| DU[7] | Low |
| DU[8] | High |

SOLID-STATE IMAGING APPARATUS

BACKGROUND OF THE INVENTION

1. Field of the Invention

The present invention relates to a solid-state imaging apparatus for use in a digital camera, a digital video camera, an endoscope, and the like.

Priority is claimed on Japanese Patent Application No. 2011-064248, filed on Mar. 23, 2011, the content of which is incorporated herein by this reference.

2. Description of Related Art

A time-to-digital converter (TDC) type analog-to-digital (A/D) converter is known as an A/D converter for measuring time (pulse width). FIG. 14 shows a configuration of the TDC type A/D converter of the related art. FIG. 15 shows an operation of the TDC type A/D converter of the related art. As shown in FIG. 14, the TDC type A/D converter is constituted by a delay circuit 102, a high-order counter circuit 103, a low-order latch circuit 104, and an encoder circuit 105.

The delay circuit 102 has a configuration in which a plurality of delay elements (one delay element 101a and seven delay elements 101b) such as INV and NAND circuits are arranged in a ring shape. Each delay element has a pulse input terminal to which a pulse is input and a pulse output terminal from which a pulse is output. The pulse input terminal is connected to a pulse output terminal of a previous-stage delay element. The pulse output terminal is connected to the pulse input terminal of a subsequent-stage delay element. The pulse output terminal of an eighth-stage delay element 101b is connected to the pulse input terminal of a first-stage delay element 101a, and eight delay elements are connected in a ring shape. These delay elements delay pulses input to pulse input terminals and output the delayed pulses from pulse output terminals. In addition, the first-stage delay element 101a has a second pulse input terminal to which a start pulse $\phi$StartP is input. The start pulse $\phi$StartP input to the first-stage delay element 101a is sequentially transmitted to a subsequent-stage delay element, so that a pulse signal is circulated within the delay circuit 102.

The high-order counter circuit 103 counts a pulse signal output by one delay element (the eighth delay element 101b of FIG. 14) constituting the delay circuit 102 as a count clock. The low-order latch circuit 104 retains (latches) an output signal of each delay element according to a sampling pulse $\phi$Samp. The encoder circuit 105 binarizes a value (phase data) retained in the low-order latch circuit 104.

Next, an operation of the TDC type A/D converter will be described using FIG. 15. Hereinafter, an example in which a pulse width of the sampling pulse $\phi$Samp is measured will be described. FIG. 15 shows waveforms of the sampling pulse $\phi$Samp and the start pulse $\phi$StartP, waveforms of output signals $\phi$CK1 to $\phi$CK8 of the delay elements constituting the delay circuit 102, and a signal $\phi$OCnt indicating a value counted by the high-order counter circuit 103. An output signal of an $n^{th}$-stage delay element is denoted by $\phi$CKn.

First, the start pulse $\phi$StartP is switched from a low level to a high level at the same time at which the sampling pulse $\phi$Samp is switched from the low level to the high level (time T101). Thereby, the pulse signal is circulated within the delay circuit 102 as indicated by the output signals $\phi$CK1 to $\phi$CK8 of FIG. 15. After a predetermined period has elapsed from time T101, the low-order latch circuit 104 retains (latches) the output signal of the delay circuit 102 at the same time a count operation is ended at the timing (time T102) when the sampling pulse $\phi$Samp is switched from the high level to the low level.

At this time, a value (phase data) retained by the low-order latch circuit 104 corresponds to one of eight stages (states 0 to 7) as shown in FIG. 15. The encoder circuit 105 binarizes an output signal of the low-order latch circuit 104. An output signal of the encoder circuit 105 is output to a subsequent-stage circuit along with an output signal $\phi$OCnt of the high-order counter circuit 103. The output signal $\phi$OCnt of the high-order counter circuit 103 has a value corresponding to the number of circulations in which the start pulse $\phi$StartP has been circulated within the delay circuit 102, thereby configuring high-order data of digital data. In addition, the output signal of the encoder circuit 105 has a value corresponding to a running position of the start pulse $\phi$StartP within the delay circuit 102, thereby configuring low-order data of the digital data.

Thereby, it is possible to obtain digital data corresponding to a pulse width of the sampling pulse $\phi$Samp. At this time, since a value (8-bit data signal) retained by the low-order latch circuit 104 correspond tone of eight states, a 3-bit data signal is generated by binarizing a value.

There is a solid-state imaging apparatus (image sensor) as an application destination of the above-described A/D converter. In Japanese Unexamined Patent Application, First Publication No. 2009-33297, an example of an A/D converter arranged for each pixel column to A/D-convert an output from a pixel is described. An image sensor described in Japanese Unexamined Patent Application, First Publication No. 2009-33297 is an image sensor (of a single-slope type) that converts a pixel signal level (voltage information) into a pulse width (time information) and A/D-converts the pulse width by a TDC type A/D converter, thereby acquiring digital data corresponding to the pixel signal level. In addition, the image sensor described in Japanese Unexamined Patent Application, First Publication No. 2009-33297 retains phase data inside a column unit provided in correspondence with each pixel column and binarizes the phase data with an encoder circuit provided outside the column unit.

SUMMARY OF THE INVENTION

According to an aspect of the present invention, a solid-state imaging apparatus includes: a pixel unit in which a plurality of pixels each having a photoelectric conversion element are arranged in a matrix; a reference signal generation unit configured to generate a reference signal that increases or decreases with the passage of time; a comparison unit configured to start a process of comparing a pixel signal to the reference signal at a timing related to an input of the pixel signal and ending the comparison process at a timing when the reference signal has satisfied a predetermined condition for the pixel signal; a delay circuit including a plurality of delay elements each having a first pulse input terminal and a pulse output terminal, wherein the first pulse input terminal of each of the plurality of delay elements is connected to the pulse output terminal of a corresponding one of the plurality of delay elements and one of the plurality of delay elements has a second pulse input terminal to which an external pulse signal is input; a low-order latch circuit configured to latch pulse signals output from the plurality of delay elements; a high-order counter circuit for counting a clock output from the delay circuit; a state variation detection circuit configured to sequentially compare pulse signals output from two delay elements of the plurality of delay elements among the pulse signals latched by the low-order latch circuit and outputting a state variation detection signal when states of the two pulse signals are different; and an encode signal latch circuit configured to latch an encode signal when the encode signal having a state corresponding to a delay element outputting a pulse signal input to the state variation detection circuit is input and the state variation detection signal is input. The delay circuit receives a pulse signal input to the second pulse input terminal at a timing related to the start of the comparison process. The low-order latch circuit latches the pulse signals output from the plurality of delay elements at a timing related to the end of the comparison process. The high-order counter circuit starts a count operation at the timing related to the start of the comparison process and ends the count operation at the timing related to the end of the comparison process. The comparison unit, the low-order latch circuit, the high-order counter circuit, the state variation detection circuit, and the encode signal latch circuit are arranged in every column or every plurality of columns of the pixel unit.

Preferably, the solid-state imaging apparatus may further include: a first pulse signal latch circuit configured to latch one of the pulse signals output from the two delay elements and outputting the latched pulse signal to the state variation detection circuit.

Preferably, the solid-state imaging apparatus may further include: a second pulse signal latch circuit configured to latch the other pulse signal output from the two delay elements and outputting the latched pulse signal to the state variation detection circuit.

Preferably, in the solid-state imaging apparatus, the state variation detection circuit may sequentially compare pulse output signals from three delay elements including the two delay elements.

BRIEF DESCRIPTION OF THE DRAWINGS

FIG. 3 is a reference diagram illustrating content of a truth table defining an operation of a state variation detection circuit according to the first embodiment of the present invention.

FIG. 4 is a reference diagram illustrating content of a table describing a relationship between a stage number of a delay element outputting a signal to the state variation detection circuit and an encode signal according to the first embodiment of the present invention.

FIG. 7 is a reference diagram illustrating an output signal of a delay element according to the first embodiment of the present invention.

FIG. 11 is a reference diagram illustrating content of a truth table defining an operation of a state variation detection circuit according to the second embodiment of the present invention.

FIG. 13 is a reference diagram illustrating an output signal of a delay element according to the second embodiment of the present invention.

DETAILED DESCRIPTION OF THE INVENTION

Hereinafter, embodiments of the present invention will be described with reference to the drawings.

(First Embodiment)

Figure 1:
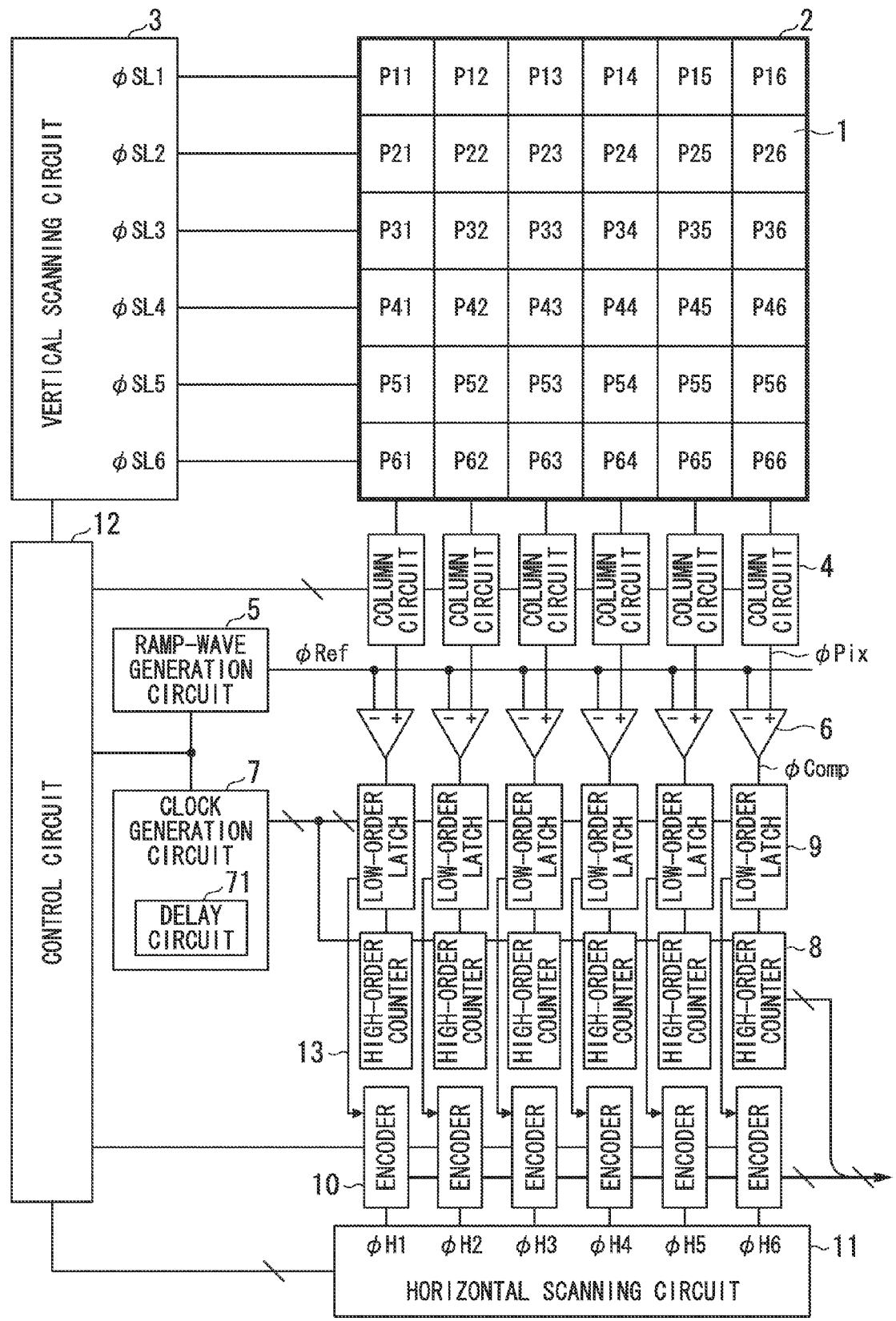
FIG. 1 is a block diagram illustrating a configuration of a solid-state imaging apparatus according to a first embodiment of the present invention.

First, a first embodiment of the present invention will be described. FIG. 1 illustrates a configuration of a solid-state imaging apparatus according to the present embodiment. The solid-stage imaging apparatus shown in FIG. 1 is constituted by a pixel array 2 (pixel unit) in which pixels 1 (P11 to P16, P21 to P26, P31 to P36, P41 to P46, P51 to P56, and P61 to P66) are two-dimensionally arranged, a vertical scanning circuit 3, column circuits 4, a ramp-wave generation circuit 5 (reference signal generation unit), comparison circuits 6 (comparison units), a clock generation circuit 7, high-order counter circuits 8, low-order latch circuits 9, encoder circuits 10, a horizontal scanning circuit 11, and a control circuit 12.

The pixel 1 has at least a photoelectric conversion element. The pixel 1 generates and outputs a pixel signal corresponding to an amount of incident light. The pixel array 2 has a plurality of pixels 1. In the example shown in FIG. 1, the pixels 1 of six rows and six columns are arranged. The vertical scanning circuit 3 is constituted by a shift register or a decoder, and selects a row of the pixel array 2. The column circuit 4 is constituted by a correlated double sampling (CDS) circuit and the like, and processes a pixel signal read from the pixel array 2 to output the processed pixel signal.

The ramp-wave generation circuit 5 generates a reference signal (ramp wave) that increases or decreases with the passage of time. According to a result of a comparison between signal levels of a pixel signal φPix output by the column circuit 4 and a reference signal φRef output by the ramp-wave generation circuit 5, the comparison circuit 6 generates a pulse signal φComp having a magnitude (pulse width) of a time-axis direction corresponding to a magnitude of the signal level of the pixel signal φPix. The clock generation circuit 7 is constituted by a delay circuit 71 in which a plurality of delay elements are arranged in a ring shape.

The high-order counter circuit 8 starts a count operation using an output signal of one delay element constituting the delay circuit 71 of the clock generation circuit 7 as a count clock at the timing of a rising position of the pulse signal φComp output by the comparison circuit 6, and ends the count operation at the timing of a falling position of the pulse signal φComp. A count value retained by the high-order counter circuit 8 corresponds to high-order data constituting digital data.

The low-order latch circuit 9 retains (latches) an output signal (phase data) of each delay element constituting the delay circuit 71 of the clock generation circuit 7 at the timing of the falling position of the pulse signal φComp output from the comparison circuit 6. The encoder circuit 10 binarizes a value retained by the low-order latch circuit 9 and outputs a binary value. The value output by the encoder circuit 10 corresponds to low-order data constituting the digital data.

The horizontal scanning circuit 11 is constituted by a shift register or a decoder and controls the high-order counter circuit 8 and the encoder circuit 10 to output values retained by the high-order counter circuit 8 and the encoder circuit 10 for each column. The control circuit 12 outputs various control signals to circuits constituting the solid-state imaging apparatus.

The ramp-wave generation circuit 5 is constituted, for example, by an integrating circuit. The ramp-wave generation circuit 5 generates a ramp wave of which a level varies with the passage of time in a sloped shape, and supplies the ramp wave to one of input terminals of the comparison circuit 6. The ramp-wave generation circuit 5 is not limited to that using the integrating circuit and a digital-to-analog converter (DAC) circuit may be used. However, when a ramp wave is configured to be digitally generated using the DAC circuit, it is necessary to make a step of the ramp wave fine or make a configuration equivalent thereto.

Figure 14:
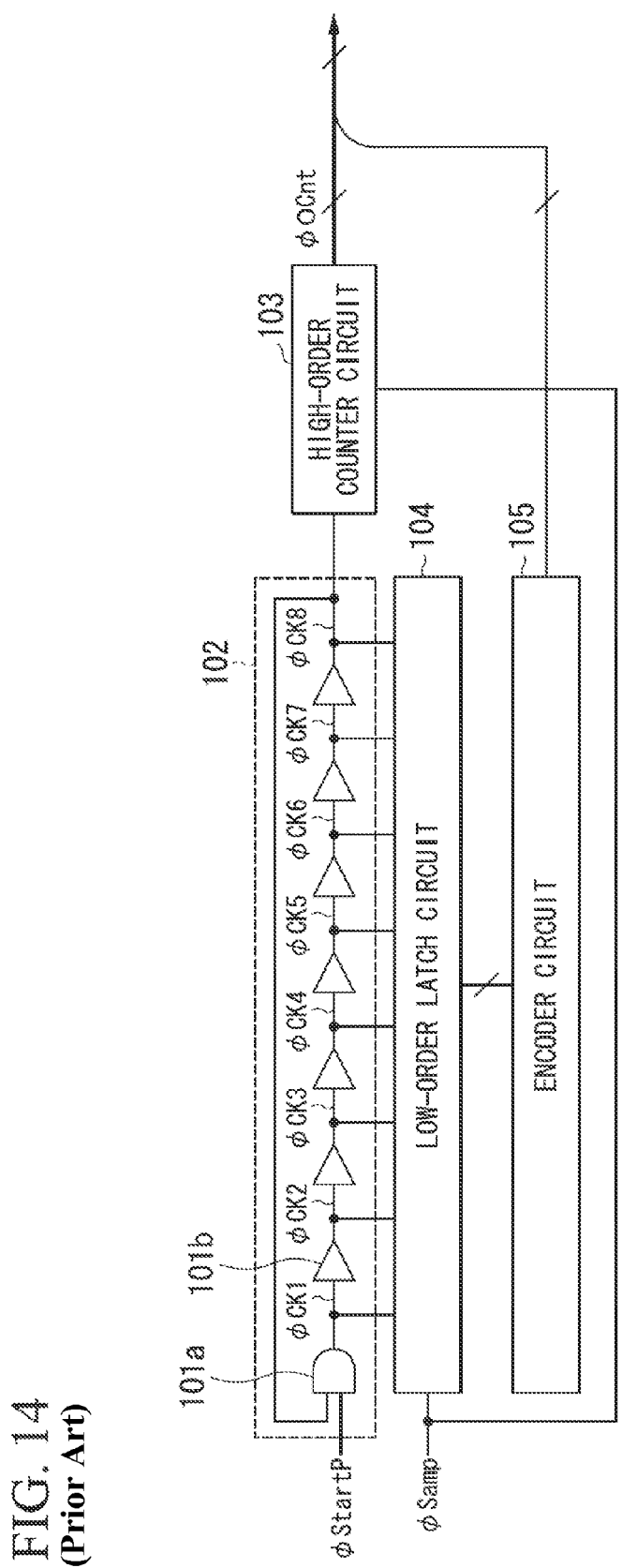
FIG. 14 is a block diagram illustrating a configuration of a TDC type A/D converter of the related art.
Figure 15:
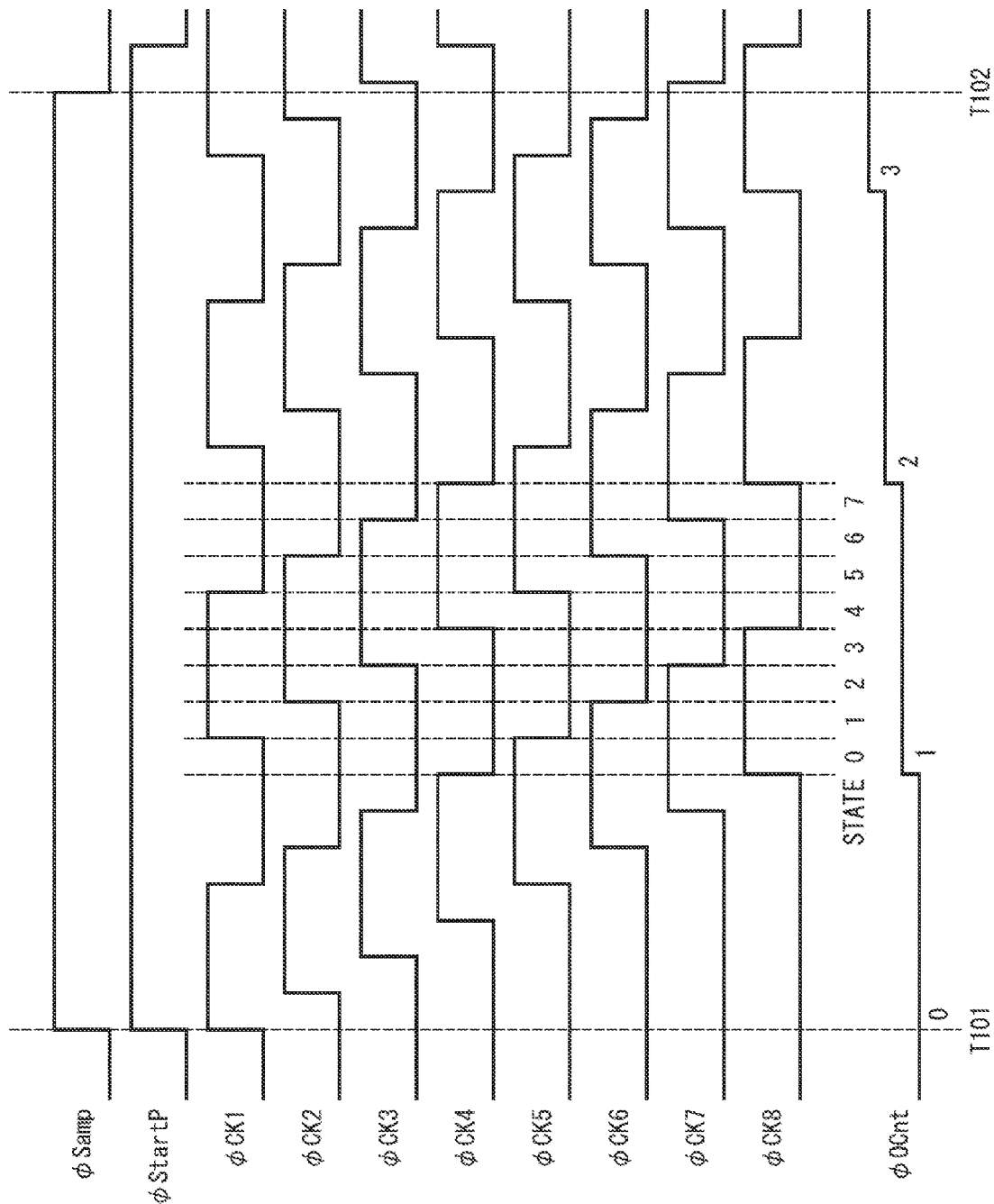
FIG. 15 is a timing chart illustrating an operation of the TDC type A/D converter of the related art.

In the present embodiment, six sets each including the column circuit 4, the comparison circuit 6, the high-order counter circuit 8, the low-order latch circuit 9, and the encoder circuit 10 are provided and arranged for every pixel column. In this embodiment, although a set of these circuits are arranged for every pixel column, the set of these circuits may be shared between a plurality of pixel columns In this embodiment, an example in which the delay circuit 71 constituting the clock generation circuit 7 is configured by 8-stage delay elements as in the delay circuit 102 shown in FIG. 14 will be described. The clock generation circuit 7 outputs an output signal φCK8 (hereinafter referred to as a clock signal) of an eighth-stage delay element as a count clock of the high-order counter circuit 8.

Figure 2:
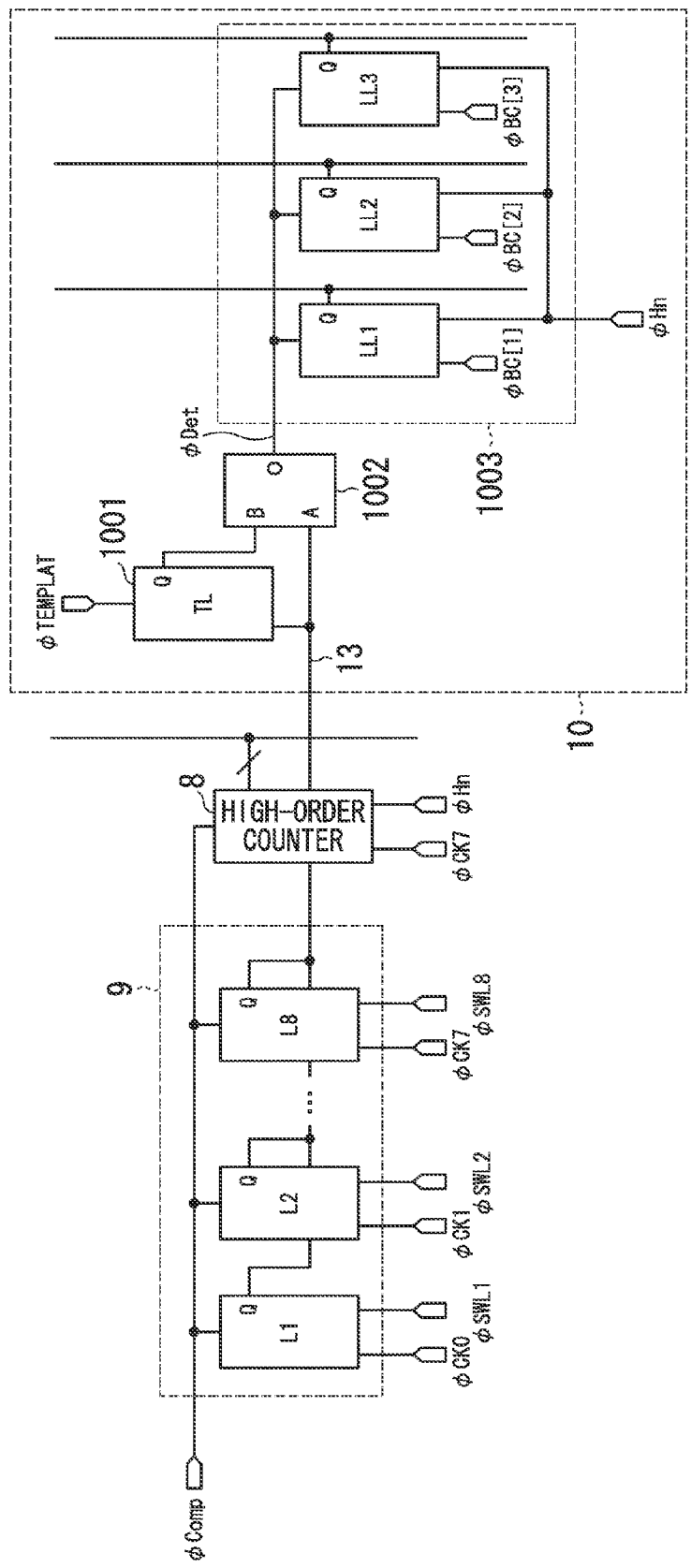
FIG. 2 is a block diagram illustrating configurations of a low-order latch circuit and an encoder circuit provided in the solid-state imaging apparatus according to the first embodiment of the present invention.

FIG. 2 illustrates the configurations of the low-order latch circuit 9 and the encoder circuit 10 according to the present embodiment.

The low-order latch circuit 9 is constituted by eight latch circuits L1 to L8 each receiving an output signal φComp of the comparison circuit 6 and retaining an output signal of each delay element of the delay circuit 71 at the timing of the falling position of the output signal φComp. Each of the eight latch circuits L1 to L8 retains a 1-bit signal. The latch circuits L1 to L8 output the output signals of delay elements to a signal transmission line 13 at timings based on output control signals φSWL1 to φSWL8. The signal transmission line 13 is connected to output terminals Q of the eight latch circuits L1 to L8 constituting the low-order latch circuit 9 and connected to a pulse signal latch circuit 1001 and a state variation detection circuit 1002 while passing through the high-order counter circuit 8.

The encoder circuit 10 is constituted by the pulse signal latch circuit 1001, the state variation detection circuit 1002, and an encode signal latch circuit 1003. The pulse signal latch circuit 1001 retains the output signal of the delay element retained by the low-order latch circuit 9 and output to the signal transmission line 13.

The state variation detection circuit 1002 has terminals A and B. The terminal A is connected to the signal transmission line 13. The terminal B is connected to an output terminal Q of the pulse signal latch circuit 1001. When an output signal of an $n^{th}$-stage delay element (hereinafter referred to as DU[n]) is output from the pulse signal latch circuit 1001, an output signal of an $(n+1)^{th}$-stage delay element DU[n+1] is output to the signal transmission line 13. The state variation detection circuit 1002 compares a signal output on the signal transmission line 13 to a signal output from the pulse signal latch circuit 1001, thereby detecting the state variation between the output signal of the $(n+1)^{th}$-stage delay element DU[n+1] and the output signal of the $n^{th}$-stage delay element DU[n].

The encode signal latch circuit 1003 has three latch circuits LL1 to LL3 for retaining an encode signal φBC[3:1]. Each of the latch circuits LL1 to LL3 receives an output signal φDet of the state variation detection circuit 1002 as a control signal, and receives an encode signal φBC (=binary code) [3:1] corresponding to a position (stage number) of a delay element outputting a signal output to the state variation detection circuit 1002 within the delay circuit 71. The encode signal latch circuit 1003 retains (latches) the encode signal φBC[3:1] according to the output signal φDet of the state variation detection circuit 1002.

The state variation detection circuit 1002 detects the state variation based on a truth table shown in FIG. 3.

In addition, a table describing a relationship between a stage number of a delay element outputting a signal to the state variation detection circuit 1002 and the encode signal φBC[3:1] is shown in FIG. 4.

Figure 5:
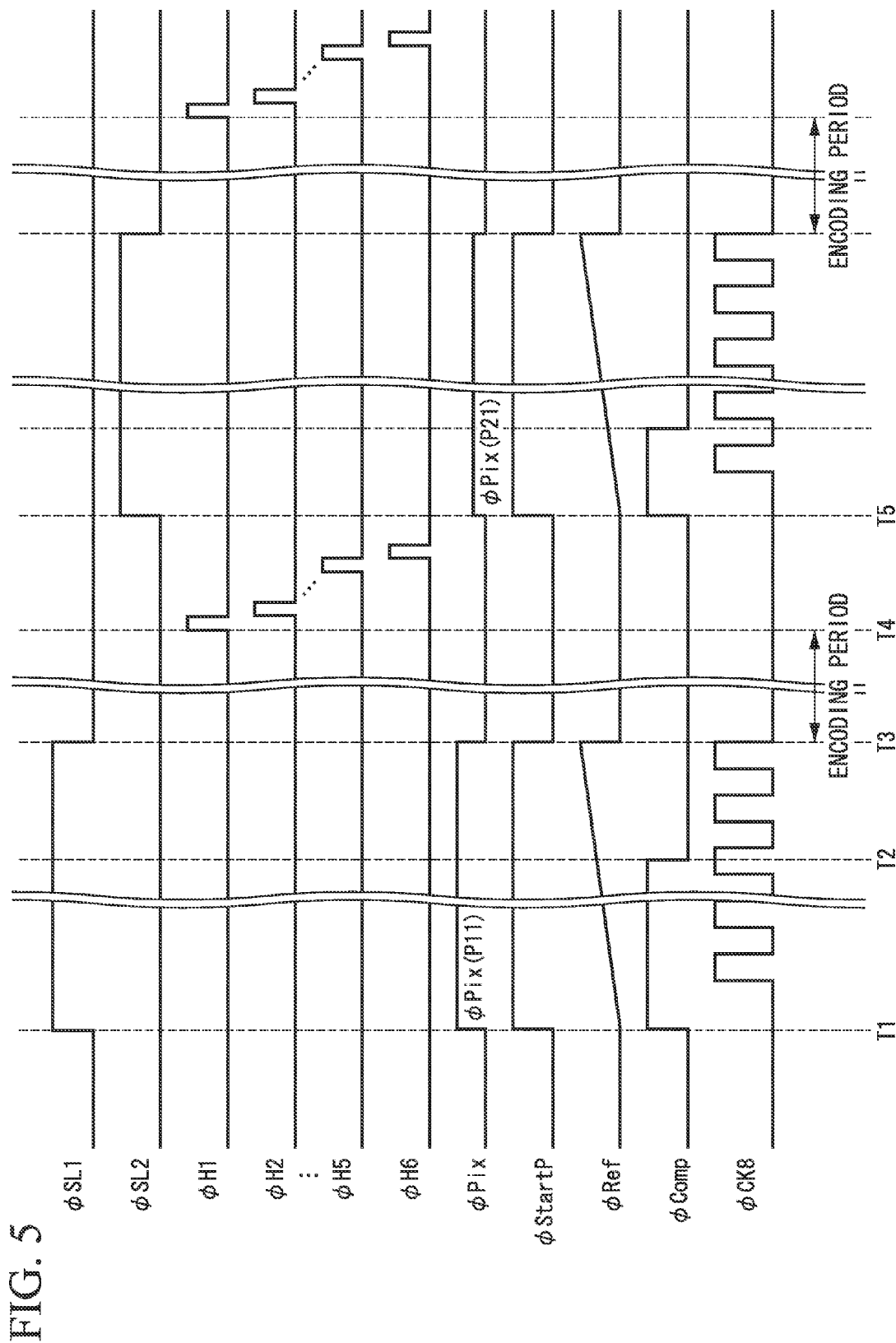
FIG. 5 is a timing chart illustrating an operation of the solid-state imaging apparatus according to the first embodiment of the present invention.
Figure 6:
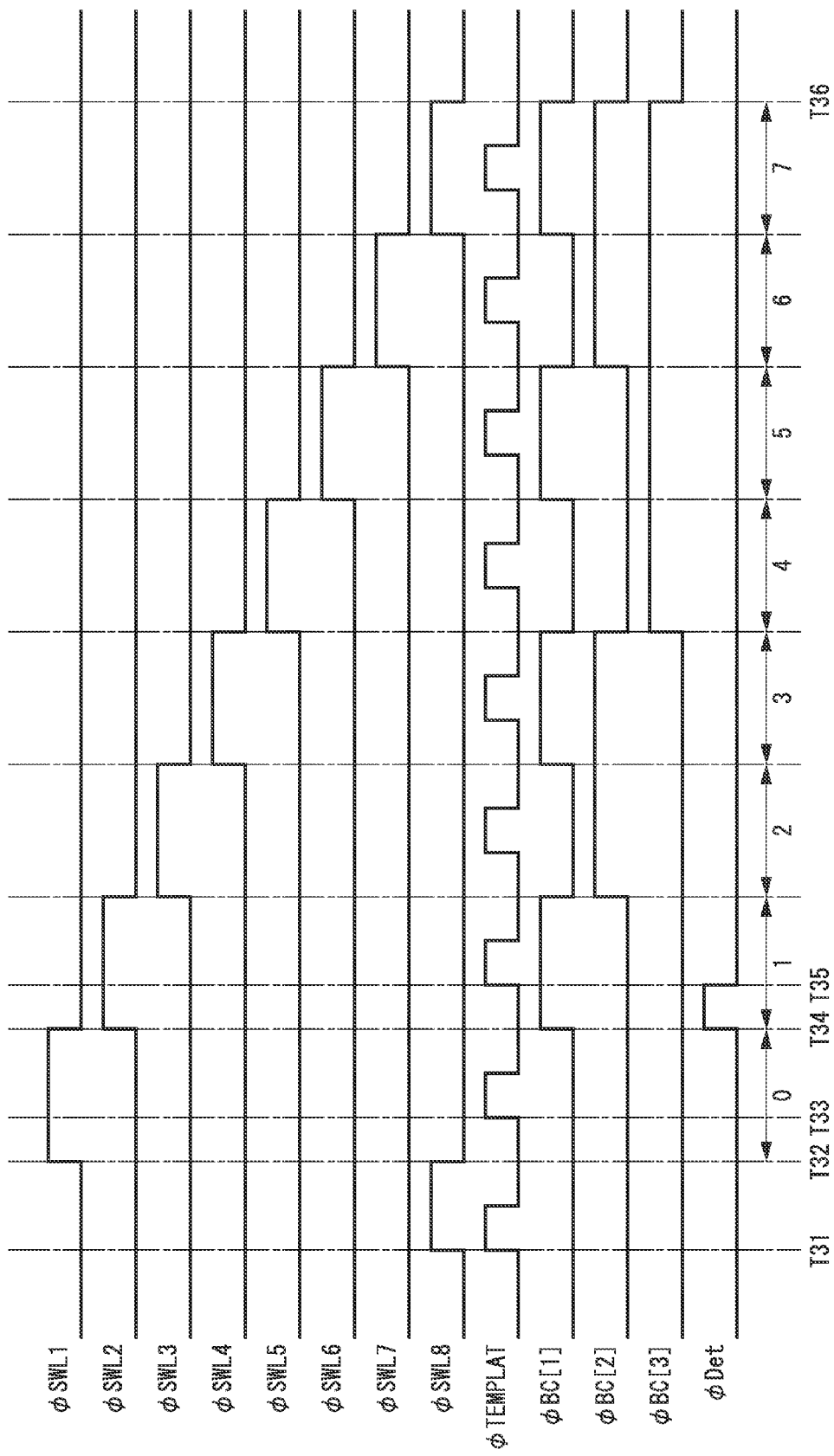
FIG. 6 is a timing chart illustrating an operation of the solid-state imaging apparatus according to the first embodiment of the present invention.

Next, the operation of the solid-state imaging apparatus according to the present embodiment will be described using the timing chart shown in FIG. 5. First, at time T1, a pixel selection signal φSL1 is switched from the low level to the high level. Thereby, first-row pixels 1 (P11, P12, P13, P14, P15, and P16) are selected and pixel signals of the pixels 1 (P11, P12, P13, P14, P15, and P16) are input to the column circuit 4. The column circuit 4 outputs a pixel signal φPix obtained by processing an input pixel signal. Hereinafter, a pixel signal of a pixel Pnm (where n=row number and m=column number) is denoted by φPix (Pnm). In FIG. 6, only processing of a first-column pixel signal is illustrated. Circuits corresponding to the columns process second- to sixth-column pixel signals in parallel with processing of the first-column pixel signal.

In addition, at time T1, a start pulse φStartP is switched from the low level to the high level, so that the clock generation circuit 7 starts to output a clock signal and the ramp-wave generation circuit 5 starts to output a reference signal φRef increasing with the passage of time. An output signal φComp of the comparison circuit 6 is switched from the low level to the high level, and the comparison circuit 6 starts to compare the reference signal φRef to a pixel signal φPix. At time T1, the high-order counter circuit 8 starts an operation of counting a clock signal.

Subsequently, at time T2, the output signal φComp of the comparison circuit is switched from the high level to the low level if the magnitude relationship between signal levels of the reference signal φRef and the pixel signal φPix is reversed. At time T2, the high-order counter circuit 8 ends an operation of counting the clock signal and the low-order latch circuit 9 retains an output signal (phase data) of the delay circuit 71.

Subsequently, at time T3, the pixel selection signal φSL1 is switched from the high level to the low level and the output of a first-row pixel signal is ended. Subsequently, the value retained by the low-order latch circuit 9 in an encoding period (between times T3 to T4) is binarized by the encoder circuit 10. Details of binarization by the encoder circuit 10 will be described in detail later.

Subsequently, at time T4, an A/D conversion result of the pixel signal φPix (P11) retained by the high-order counter circuit 8 and the encoder circuit 10 is output if a column selection signal φH1 is switched from the low level to the high level.

Thereafter, likewise, column selection signals φH2 to φH6 are sequentially switched from the low level to the high level, so that a first-row reading operation is completed.

Thereafter, it is possible to obtain digital data of all pixel signals generated from the pixel array 2 by reading second- to sixth-row pixel signals as in the first row.

Next, an operation related to an encoding period (between T3 and T4) will be described using the timing chart shown in FIG. 6. Hereinafter, an example in which an output signal of each delay element retained by the row-order latch circuit 9 has a value shown in FIG. 7 will be described.

First, at time T31, an output control signal φSWL8 and a latch signal φTEMPLAT become high. Thereby, an output signal of an eighth-stage delay element DU[8] retained by the low-order latch circuit 9 is output to the signal transmission line 13, and the pulse signal latch circuit 1001 receives an output signal of the eighth-stage delay element DU[8] from the signal transmission line 13. Thereafter, the latch signal φTEMPLAT becomes low, so that the pulse signal latch circuit 1001 retains the output signal of the delay element DU[8].

Subsequently, at time T32, an output control signal φSWL1 becomes high at the same time at which the output control signal φSWL8 becomes low. In addition, at time T32, an encode signal φBC[3:1] becomes $0_{(10)}$, where (10) indicates a decimal.

When the encode signal φBC[3:1] becomes $0_{(10)}$, an output signal of a first-stage delay element DU[1] is output to the signal transmission line 13. At this time, the output signal of the first-stage delay element DU[1] and the output signal of the eighth-stage delay element DU[8] are input to input terminals A and B of the state variation detection circuit 1002, respectively. As shown in FIG. 7, because the output signal of the eighth-stage delay element DU[8] and the output signal of the first-stage delay element DU[1] become low, the state variation detection circuit 1002 outputs a low signal according to the truth table shown in FIG. 3.

Subsequently, at time T33, the latch signal φTEMPLAT becomes high. Thereby, the pulse signal latch circuit 1001 receives the output signal of the first-stage delay element DU[1] from the signal transmission line 13. Thereafter, the latch signal φTEMPLAT becomes low, and therefore, the pulse signal latch circuit 1001 retains the output signal of the first-stage delay element DU[1]. At this time, because the same signal is input to the input terminals A and B of the state variation detection circuit 1002, the state variation detection circuit 1002 outputs the low signal.

Subsequently, at time T34, the encode signal φBC[3:1] becomes $1_{(10)}$ at the same time at which the output control signal φSWL1 becomes low and the output control signal φSWL2 becomes high. Thereby, an output signal of a second-stage delay element DU[2] is output to the signal transmission line 13. At this time, the output signal of the second-stage delay element DU[2] and the output signal of the first-stage delay element DU[1] are input to the input terminals A and B of the state variation detection circuit 1002, respectively. As shown in FIG. 7, because the output signal of the first-stage delay element DU[1] is low and the output signal of the second-stage delay element DU[2] is high, the state variation detection circuit 1002 outputs the high signal according to the truth table shown in FIG. 3. Because the high signal has been output from the state variation detection circuit 1002, the encode signal latch circuit 1003 receives and retains the encode signal φBC[3:1]=$1_{(10)}$.

Subsequently, at time T35, the latch signal φTEMPLAT becomes high. Thereby, the pulse signal latch circuit 1001 retains the output signal of the second-stage delay element DU[2]. Thereafter, the latch signal φTEMPLAT becomes low, and therefore, the pulse signal latch circuit 1001 retains the output signal of the second-stage delay element DU[2]. At this time, because the same signal is input to the input terminals A and B of the state variation detection circuit 1002, the state variation detection circuit 1002 outputs the low signal. Thereby, the encode signal latch circuit 1003 retains the encode signal φBC[3:1]=$1_{(10)}$.

Hereinafter, likewise, until time T36, the state variation detection circuit 1002 sequentially compares an output signal of an $n^{th}$-stage delay element DU[n] to an output signal of an $(n+1)^{th}$-stage delay element DU[n+1]. During this time, because the state variation detection circuit 1002 does not detect the state variation, the encode signal latch circuit 1003 still retains the encode signal φBC[3:1]=$1_{(10)}$.

Thereby, an operation related to an encoding period ends. According to the above-described operation, it is possible to perform an encoding operation within a column unit in the solid-stage imaging apparatus according to the present embodiment. According to the present embodiment, complex phase adjustment is unnecessary and the speed or the number of pixels can be increased.

Figure 8:
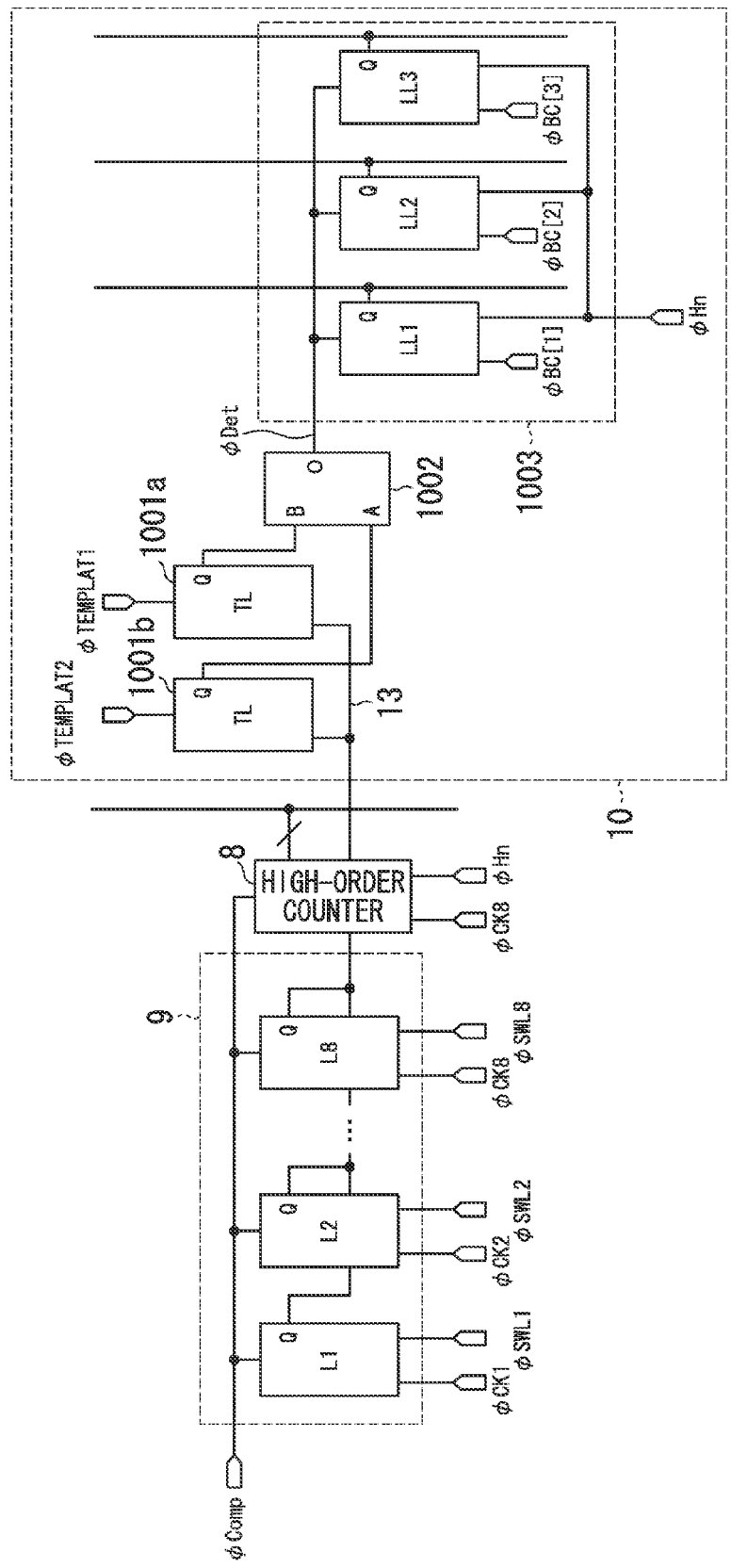
FIG. 8 is a block diagram illustrating configurations of a low-order latch circuit and an encoder circuit provided in the solid-state imaging apparatus according to a modified example of the first embodiment of the present invention.

Next, a modified example of this embodiment will be described. FIG. 8 shows the configurations of the low-order latch circuit 9 and the encoder circuit 10 according to a first modified example. In FIG. 8, two pulse signal latch circuits 1001a and 1001b are provided. In relation to an operation of comparing the output signal of the $n^{th}$-stage delay element DU[n] to the output signal of the $(n+1)^{th}$-stage delay element DU[n+1], the output signal of the $n^{th}$-stage delay element DU[n] is retained in the pulse signal latch circuit 1001a, the output signal of the $(n+1)^{th}$-stage delay element DU[n+1] is retained in the pulse signal latch circuit 1001b, and the output signals of the pulse signal latch circuits 1001a and 1001b are input to the state variation detection circuit 1002.

Figure 9:
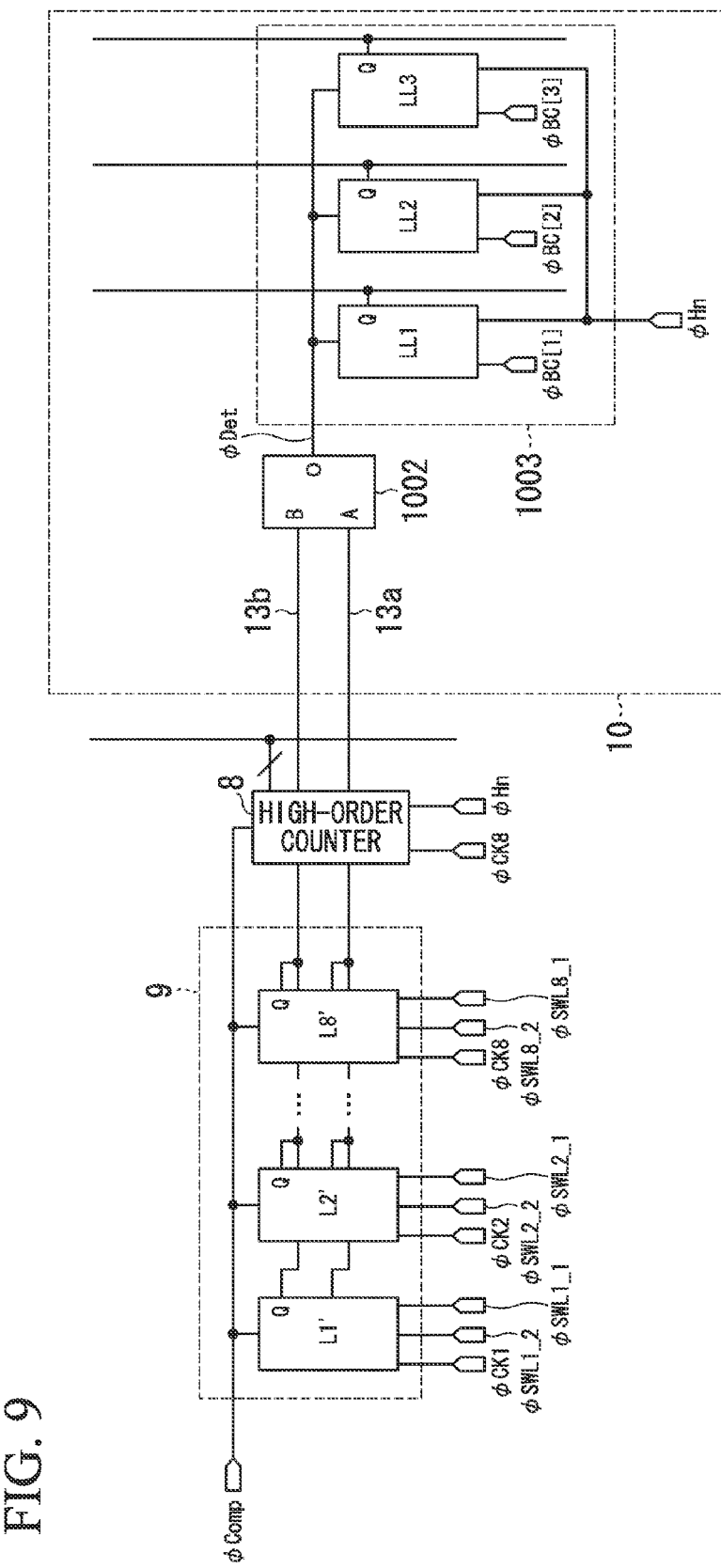
FIG. 9 is a block diagram illustrating configurations of a low-order latch circuit and an encoder circuit provided in the solid-state imaging apparatus according to a modified example of the first embodiment of the present invention.

FIG. 9 shows the configurations of the low-order latch circuit 9 and the encoder circuit 10 according to a second modified example. In FIG. 9, two signal transmission lines 13a and 13b are provided. The signal transmission line 13a is connected to output terminals Q of the eight latch circuits L1 to L8 constituting the low-order latch circuit 9, and connected to an input terminal A of the state variation detection circuit 1002 while passing through the high-order counter circuit 8. The signal transmission line 13b is connected to the output terminals Q of the eight latch circuits L1 to L8 constituting the low-order latch circuit 9, and connected to an input terminal B of the state variation detection circuit 1002 while passing through the high-order counter circuit 8.

In addition, the latch circuits L1 to L8 output retained signals to the signal transmission line 13a according to output control signals φSWL1_1 to φSWL8_1, and output retained signals to the signal transmission line 13b according to output control signals φSWL1_2 to φSWL8_2. According to the configuration described above, the state variation detection circuit 1002 can compare the output signal of the $n^{th}$-stage delay element DU[n] to the output signal of the $(n+1)^{th}$-stage delay element DU[n+1] in a state in which the pulse signal latch circuit 1001 is not provided. In the configuration shown in FIG. 8 compared with the configuration shown in FIG. 9, it is possible to reduce the number of signal lines through which a data signal is transmitted within the column unit and reduce a circuit area. Thus, it is possible to further reduce a size of the solid-state imaging apparatus.

(Second Embodiment)

Figure 10:
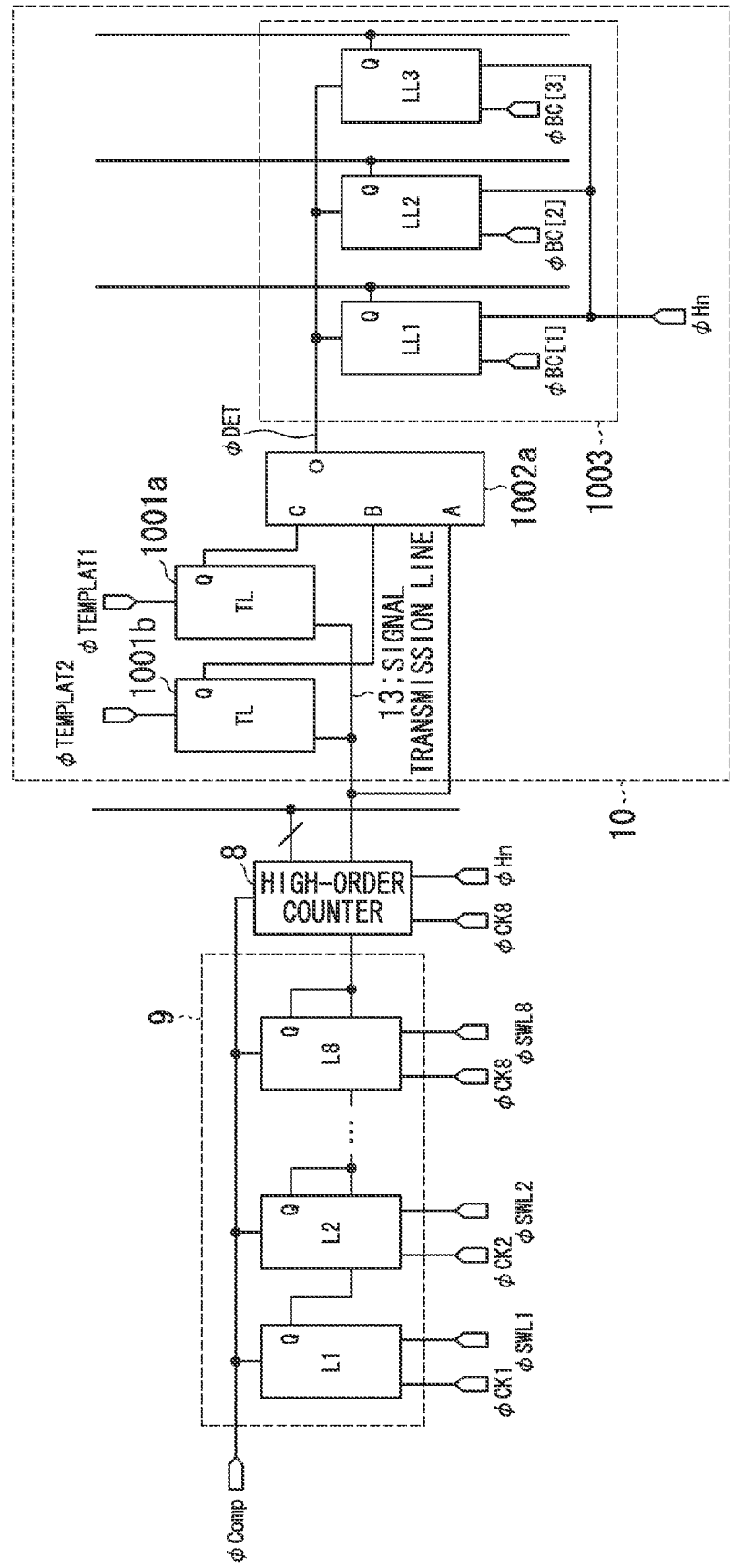
FIG. 10 is a block diagram illustrating a configuration of a low-order latch circuit and an encoder circuit provided in a solid-state imaging apparatus according to a second embodiment of the present invention.

Next, the second embodiment of the present invention will be described. FIG. 10 shows the configurations of the low-order latch circuit 9 and the encoder circuit 10 according to this embodiment. Hereinafter, only the differences from the configuration shown in FIG. 2 will be described.

In FIG. 10, two pulse signal latch circuits 1001a and 1001b and a state variation detection circuit 1002a are provided. In relation to an operation of comparing the output signal of the $n^{th}$-stage delay element DU[n] to the output signal of the $(n+1)^{th}$-stage delay element DU[n+1], the output signal of the $n^{th}$-stage delay element DU[n] is retained in the pulse signal latch circuit 1001a, the output signal of the $(n+1)^{th}$-stage delay element DU[n+1] is retained in the pulse signal latch circuit 1001b, and the output signals of the pulse signal latch circuits 1001a and 1001b are input to the state variation detection circuit 1002a.

The state variation detection circuit 1002a has terminals A, B, and C. The terminal A is connected to the signal transmission line 13, the terminal B is connected to an output terminal Q of the pulse signal latch circuit 1001b, and the terminal C is connected to an output terminal Q of the pulse signal latch circuit 1001a. When the output signal of the $n^{th}$-stage delay element DU[n] is output from the pulse signal latch circuit 1001a, the output signal of the $(n+1)^{th}$ delay element DU[n+1] is output from the pulse signal latch circuit 1001b and the output signal of the $(n+2)^{th}$ delay element DU[n+2] is output to the signal transmission line 13. The state variation detection circuit 1002a detects state variations between the output signal of the $(n+2)^{th}$ delay element DU[n+2], the output signal of the $(n+1)^{th}$ delay element DU[n+1], and the output signal of the $n^{th}$-stage delay element DU[n] by comparing the signal output to the signal transmission line 13 to the signal output from the pulse signal latch circuit 1001b and the signal output from the pulse signal latch circuit 1001a. The state variation detection circuit 1002a detects the state variation on the basis of the truth table shown in FIG. 11.

Figure 12:
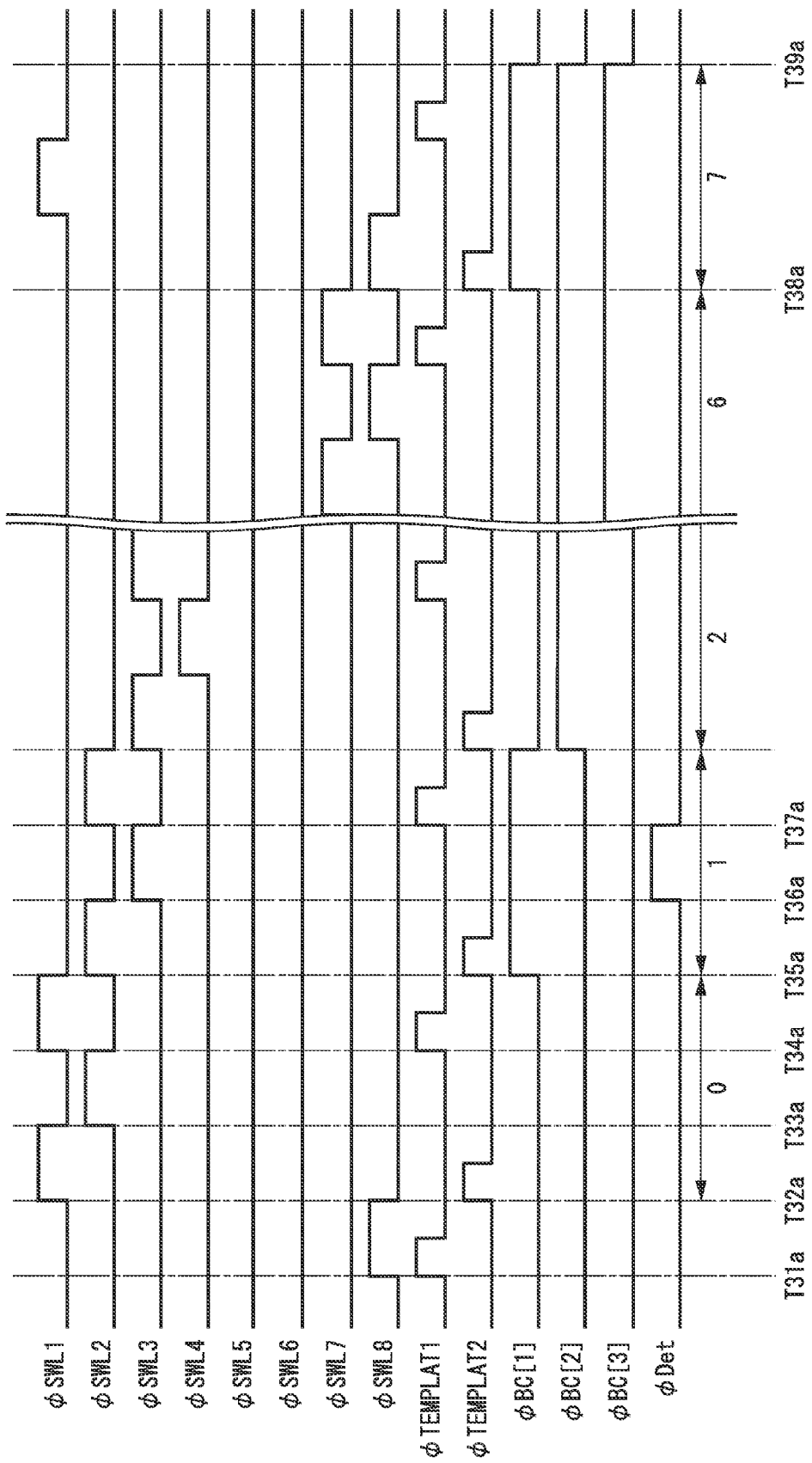
FIG. 12 is a timing chart illustrating an operation of the solid-state imaging apparatus according to the second embodiment of the present invention.

Next, the operation of the solid-state imaging apparatus according to the present embodiment will be described using the timing chart shown in FIG. 12. Because the operation is the same as described in the first embodiment except for the operation related to the encoding period, description thereof is omitted. Hereinafter, an example in which there are two or more positions where the state variation occurs in the output signal of the delay element due to the jitter of the output signal of the delay element or the control signal in relation to the output signal of each delay element retained by the low-order latch circuit 9 will be described. In FIG. 13, it is assumed that the output signal of the delay element DU[8] becomes high due to the effect of jitter. With respect to each of input terminals A, B, and C, the state variation detection circuit 1002a makes a determination based on the truth table shown in FIG. 11 at the timing when an output signal of a different delay element is input without making the determination at other timings.

First, at time T31a, an output control signal φSWL8 and a latch signal φTEMPLAT become high.

Thereby, an output signal of the eighth-stage delay element DU[8] retained by the low-order latch circuit 9 is output to the signal transmission line 13, and the pulse signal latch circuit 1001a receives an output signal of the eighth-stage delay element DU[8] from the signal transmission line 13. Thereafter, the latch signal φTEMPLAT becomes low, and there- fore, the pulse signal latch circuit 1001a retains the output signal of the eighth-stage delay element DU[8].

Subsequently, at time T32a, the output control signal φSWL8 becomes low and the output control signal φSWL1 and the latch signal φTEMPLAT2 become high. In addition, at time T32a, the encode signal φBC[3:1] becomes $0_{(10)}$. Thereby, the output signal of the first-stage delay element DU[1] is output to the signal transmission line 13, and the pulse signal latch circuit 1001b receives the output signal of the first-stage delay element DU[1] from the signal transmission line 13. Thereafter, the latch signal φTEMPLAT2 becomes low, and therefore, the pulse signal latch circuit 1001b retains the output signal of the first-stage delay element DU[1].

Subsequently, at time T33a, the output control signal φSWL2 becomes high at the same time at which the output control signal φSWL1 becomes low. Thereby, the output signal of the second-stage delay element DU[2] is output to the signal transmission line 13. At this time, the output signal (High) of the second-stage delay element DU[2], the output signal (Low) of the first-stage delay element DU[1], and the output signal (High) of the eighth-stage delay element DU[8] are input to the input terminals A, B, and C of the state variation detection circuit 1002a, respectively. Thus, the state variation detection circuit 1002a outputs the low signal according to the truth table shown in FIG. 11.

Subsequently, at time T34a, the output control signal φSWL1 and the latch signal φTEMPLAT1 become high. Thereby, the output signal of the first-stage delay element DU[1] is output to the signal transmission line 13, and the pulse signal latch circuit 1001a receives the output signal of the first-stage delay element DU[1] from the signal transmission line 13. Thereafter, the latch signal φTEMPLAT1 becomes low, and therefore, the pulse signal latch circuit 1001a retains the output signal of the first-stage delay element DU[1].

Subsequently, at time T35a, the output control signal φSWL2 and the latch signal φTEMPLAT2 become high at the same time at which the output control signal φSWL1 becomes low. In addition, at time T35a, the encode signal φBC[3:1] becomes $1_{(10)}$. Thereby, the output signal of the second-stage delay element DU[2] is output to the signal transmission line 13, and the pulse signal latch circuit 1001b receives the output signal of the second-stage delay element DU[2] from the signal transmission line 13. Thereafter, the latch signal φTEMPLAT2 becomes low, and therefore, the pulse signal latch circuit 1001b retains the output signal of the second-stage delay element DU[2].

Subsequently, at time T36a, the output control signal φSWL2 becomes low and the output control signal φSWL3 becomes high. Thereby, the output signal of the third-stage delay element DU[3] is output to the signal transmission line 13. At this time, the output signal (High) of the third-stage delay element DU[3], the output signal (High) of the second-stage delay element DU[2], and the output signal (Low) of the first-stage delay element DU[1] are input to the input terminals A, B, and C of the state variation detection circuit 1002a, respectively. Thus, the state variation detection circuit 1002a outputs the high signal according to the truth table shown in FIG. 11. Because the high signal has been output from the state variation detection circuit 1002a, the encode signal latch circuit 1003 receives and retains the encode signal φBC[3:1] =$1_{(10)}$.

Subsequently, at time T37a, the output control signal φSWL2 and the latch signal φTEMPLAT1 become high. Thereby, the output signal of the second-stage delay element DU[2] is output to the signal transmission line 13, and the pulse signal latch circuit 1001*a* receives the output signal of the second-stage delay element DU[2] from the signal transmission line 13. Thereafter, the latch signal φTEMPLAT1 becomes low, and therefore, the pulse signal latch circuit 1001*a* retains the output signal of the second-stage delay element DU[2].

Thereafter, likewise, until time T39*a*, the state variation detection circuit 1002*a* sequentially compares the output signal of the $n^{th}$-stage delay element DU[n], the output signal of the $(n+1)^{th}$-stage delay element DU[n+1], and the output signal of the $(n+2)^{th}$-stage delay element DU[n+2]. During this time, because the state variation detection circuit 1002*a* does not detect the state variation, the encode signal latch circuit 1003 still retains the encode signal $\phi BC[3:1]=1_{(10)}$. Even when the state variation between the output signal of the seventh-stage delay element DU[7] and the output signal of the eighth-stage delay element DU[8] is detected between times T38*a* and T39*a*, the state variation detection circuit 1002*a* outputs the low signal without detecting the state variation because the output signal (Low) of the first-stage delay element DU[1], the output signal (High) of the eighth-stage delay element DU[8], and the output signal (Low) of the seventh-stage delay element DU[7] are input to the input terminals A, B, and C of the state variation detection circuit 1002*a*, respectively.

Thereby, the operation related to the encoding period ends. According to the above-described operation, the solid-state imaging apparatus according to the present embodiment can perform an encoding operation within the column unit. According to the present embodiment, complex phase adjustment is unnecessary and the speed or the number of pixels can be increased.

Furthermore, it is possible to accurately perform an encoding operation even when there are two positions where the state variation occurs in the output signal of the delay element due to the effect of jitter. According to the present embodiment, it is possible to perform the encoding operation with higher accuracy.

Although the exemplary embodiments of the present invention have been described above with reference to the drawings, specific configurations are not limited to the above-described embodiments and various design changes may be made without departing from the scope of the present invention.

While preferred embodiments of the invention have been described and illustrated above, it should be understood that these are examples of the invention and are not to be considered as limiting. Additions, omissions, substitutions, and other modifications can be made without departing from the spirit or scope of the invention.

What is claimed is:

1. A solid-state imaging apparatus comprising:
    a pixel unit in which a plurality of pixels each having a photoelectric conversion element are arranged in a matrix;
    a reference signal generation unit configured to generate a reference signal that increases or decreases with the passage of time;
    a comparison unit configured to start a process of comparing a pixel signal to the reference signal at a timing related to an input of the pixel signal and ending the comparison process at a timing when the reference signal has satisfied a predetermined condition for the pixel signal;
    a delay circuit including a plurality of delay elements each having a first pulse input terminal and a pulse output terminal, wherein the first pulse input terminal of each of the plurality of delay elements is connected to the pulse output terminal of a corresponding one of the plurality of delay elements and one of the plurality of delay elements has a second pulse input terminal to which an external pulse signal is input;
    a low-order latch circuit configured to latch pulse signals output from the plurality of delay elements;
    a high-order counter circuit configured to count a clock output from the delay circuit;
    a state variation detection circuit configured to sequentially compare pulse signals output from two delay elements of the plurality of delay elements among the pulse signals latched by the low-order latch circuit and outputting a state variation detection signal when states of the two pulse signals are different; and
    an encode signal latch circuit configured to latch an encode signal when the encode signal having a state corresponding to a delay element outputting a pulse signal input to the state variation detection circuit is input and the state variation detection signal is input,
    wherein the delay circuit receives a pulse signal input to the second pulse input terminal at a timing related to the start of the comparison process,
    the low-order latch circuit latches the pulse signals output from the plurality of delay elements at a timing related to the end of the comparison process,
    the high-order counter circuit starts a count operation at the timing related to the start of the comparison process and ends the count operation at the timing related to the end of the comparison process, and
    the comparison unit, the low-order latch circuit, the high-order counter circuit, the state variation detection circuit, and the encode signal latch circuit are arranged in every column or every plurality of columns of the pixel unit.

2. The solid-state imaging apparatus according to claim 1, further comprising:
    a first pulse signal latch circuit configured to latch one of the pulse signals output from the two delay elements and outputting the latched pulse signal to the state variation detection circuit.

3. The solid-state imaging apparatus according to claim 2, further comprising:
    a second pulse signal latch circuit configured to latch the other of the pulse signals output from the two delay elements and outputting the latched pulse signal to the state variation detection circuit.

4. The solid-state imaging apparatus according to claim 1, wherein the state variation detection circuit sequentially compares pulse output signals from three delay elements including the two delay elements.

* * * * *